(12) United States Patent
Cheng et al.

(10) Patent No.: US 8,208,190 B2
(45) Date of Patent: Jun. 26, 2012

(54) OPTICAL IMAGING SYSTEM

(75) Inventors: Chu-Ming Cheng, Hsinchu (TW);
Jyh-Long Chern, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/957,407

(22) Filed: Dec. 1, 2010

(65) Prior Publication Data
US 2012/0026575 A1 Feb. 2, 2012

(30) Foreign Application Priority Data

Jul. 28, 2010 (TW) ................................ 99124914 A

(51) Int. Cl.
*G02B 26/00* (2006.01)
*G02B 21/00* (2006.01)

(52) U.S. Cl. ......... 359/238; 359/368; 359/276; 359/279

(58) Field of Classification Search .......... 359/237–239, 359/290–295, 298, 245, 247, 276, 278, 279, 359/368; 356/369, 402, 450, 453, 456, 492, 356/55
See application file for complete search history.

(56) References Cited

U.S. PATENT DOCUMENTS 6,295,155 B1 * 9/2001 Suga .............................. 359/238
6,839,166 B2 * 1/2005 Fukushima et al. ........... 359/368

OTHER PUBLICATIONS

Dowski Jr. et al., "Extended depth of field through wave-front coding", Applied Optics, Apr. 10, 1995, vol. 34, No. 11, pp. 1859-1866.
Ojeda-Castañeda et al., "Annular apodizers for low sensirivity to defocus and to spherical aberration", Optics Letters, Aug. 1986, vol. 11, No. 8, pp. 487-489.
Levin et al., "Image and Depth from a Conventional Camera with a Coded Aperture", MIT CSAIL, pp. 1-61.
Levin et al., "4D Frequency Analysis of Computational Cameras for Depth of Filed Extension", Computer Science and Artificial Intelligence Laboratory Technical Report, MIT-CSAIL-TR-2009-019, May 8, 2009. pp. 1-20.

\* cited by examiner

*Primary Examiner* — Loha Ben
(74) *Attorney, Agent, or Firm* — Jianq Chyun IP Office

(57) ABSTRACT

An optical imaging system including an imaging lens and a spatial light modulator is provided. The imaging system has an aperture stop position. The spatial light modulator is disposed at the aperture stop position of the imaging system to serve as a pupil of the imaging lens. The spatial light modulator is adapted to modulate the light transmission rate of the spatial light modulator to change an amplitude and a phase of a light intensity of the pupil.

17 Claims, 11 Drawing Sheets

OPTICAL IMAGING SYSTEM

CROSS-REFERENCE TO RELATED APPLICATION

This application claims the priority benefit of Taiwan application serial no. 99124914, filed on Jul. 28, 2010. The entirety of the above-mentioned patent application is hereby incorporated by reference herein and made a part of this specification.

BACKGROUND OF THE INVENTION

1. Field of the Invention

The invention relates generally relates to an optical system, and more particularly, to an optical imaging system.

2. Description of Related Art

Imaging lenses are one of the most important components in optical systems such as video cameras, digital cameras, projectors, microscopes, and endoscopes. Due to cost considerations, typically spherical glass lenses are adopted for the lenses of an imaging lens. The formed images are not totally equivalent to the original objects because of the added effects of phase differences, diffraction, and dispersion for the optical paths of the optical systems result, which result in image aberrations.

In order to achieve preferable imaging effects, optical design engineers have conventionally begun with the lenses themselves, for instance by adopting aspheric lenses, cemented lenses, or by specifically designing each curvature of the lenses for preferred combinations. However, the use of aspheric lenses drastically increases the manufacturing cost, the design complexity, and the optical system sensitivity. Therefore, professional photographers frequently spend extraordinary amounts of money to purchase expensive lenses.

Moreover, when the imaging lens is applied in medical equipments (e.g., fundus cameras or endoscopes examining the mouth and throat), because the human anatomy for areas such as the fundus oculi, the throat, and the mouth are extremely three-dimensional, very close shooting with the lenses result in a shallow depth of field. Therefore, in an image it is difficult to clearly present structures of different distances from the lens. When shot over a plurality of photographs, then a comparison between the different structures becomes difficult.

Additionally, when using conventional imaging cameras, a resolution of the optical system is limited by a choice of an imaging lens. Hence, adaptive adjustments of resolution for different user requirements cannot be made.

SUMMARY OF THE INVENTION

Accordingly, the invention is directed to an optical imaging lens capable of effectively compensating for an optical image aberration and enhancing an image resolution, having a preferable depth of field, and having an adjustable imaging effect according to a user requirement.

An embodiment of the invention provides an optical imaging system, including an imaging lens and a spatial light modulator. The imaging lens has an aperture stop position. The spatial light modulator is disposed at the aperture stop position of the imaging lens to serve as a pupil of the imaging lens. The spatial light modulator is adapted to modulate a light transmission rate of the spatial light modulator, so as to change an amplitude and a phase of a light intensity of the pupil.

Another embodiment of the invention provides an optical imaging system adapted to image an object onto an image plane. The optical imaging system includes an imaging lens and a spatial light modulating light source. The imaging lens has an aperture stop position. The spatial light modulating light source is adapted to provide a structural beam for illuminating the object. The structural beam is imaged at the aperture stop position. The spatial light modulating light source is adapted to modulate the structural beam, so as to change an image of the structural beam at the aperture stop position. The aperture stop position is disposed on a transmission path of the structural beam between the spatial light modulating light source and the image plane.

In summary, in an optical imaging system according to an embodiment of the invention, a spatial light modulator is employed to serve as a pupil, or a spatial light modulating light source is employed to provide a structural beam imaged at the aperture stop position. Accordingly, the spatial light modulator or the spatial light modulating light source are modulated so as to deform the pupil or the structural beam. Thereby, different imaging effects may be produced according to user requirements.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
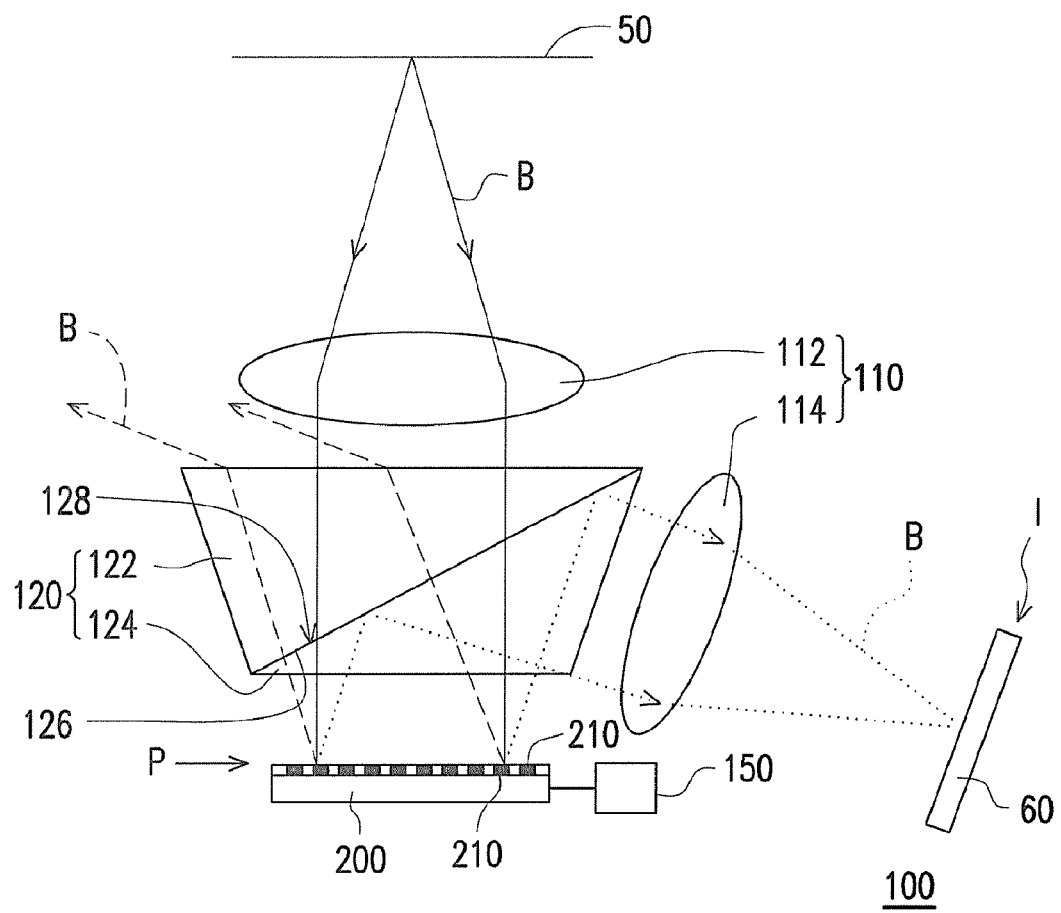
FIG. 1A is a schematic view of an optical path of an optical imaging system according to an embodiment of the invention.
Figure 1B:
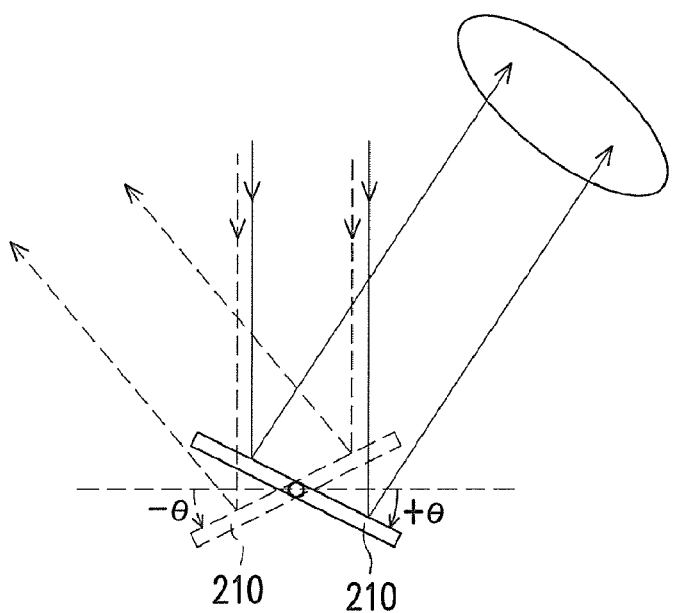
FIG. 1B illustrates a micromirror in the digital micromirror device depicted in FIG. 1A and an optical path produced therewith.
Figure 2:
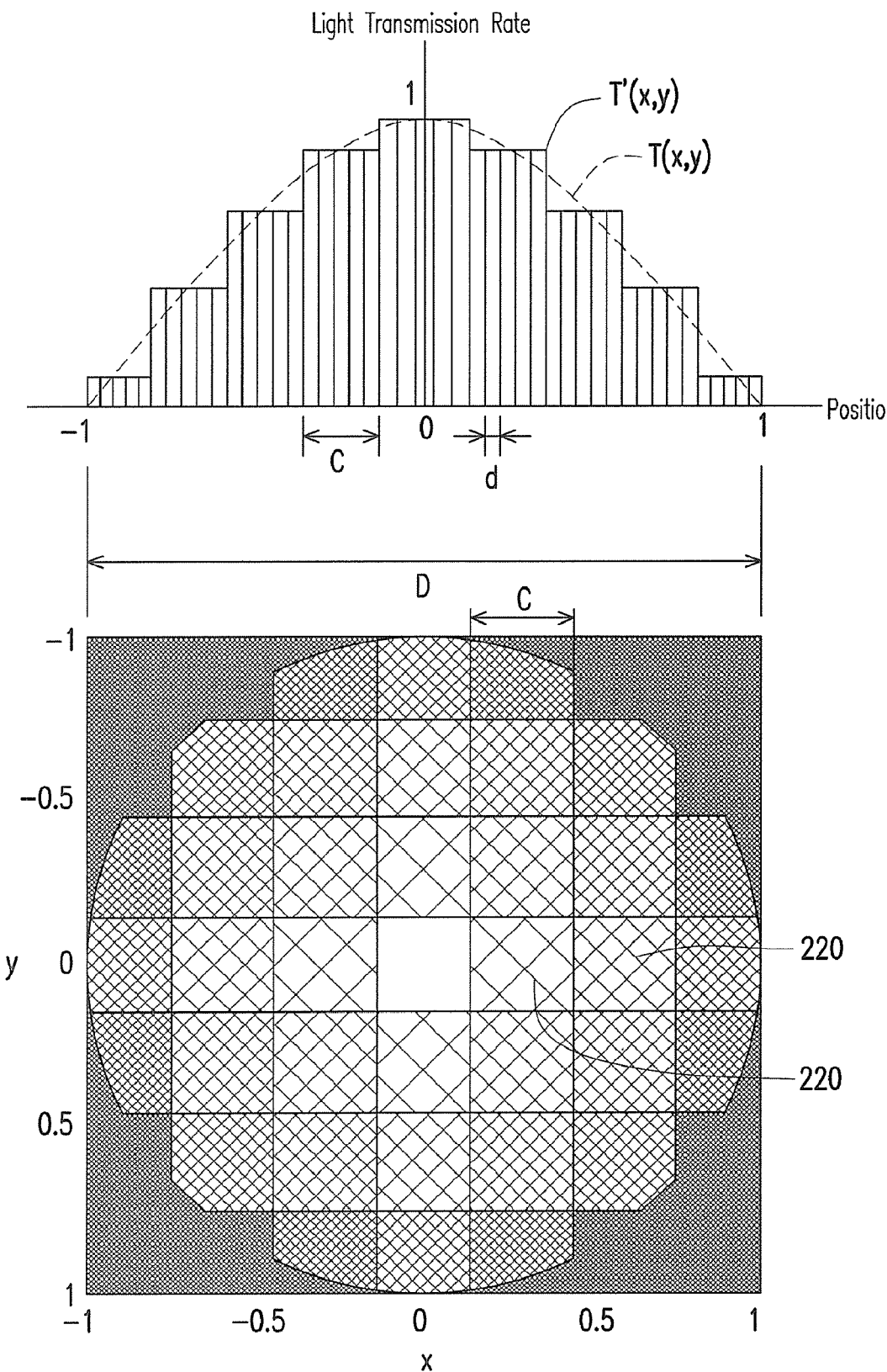
FIG. 2 is a distribution diagram of a light transmission rate of the digital micromirror device depicted in FIG. 1A under a specific condition.

FIG. 1A is a schematic view of an optical path of an optical imaging system according to an embodiment of the invention. FIG. 1B illustrates a micromirror in the digital micromirror device depicted in FIG. 1A and an optical path produced therewith. FIG. 2 is a distribution diagram of a light transmission rate of the digital micromirror device depicted in FIG. 1A under a specific condition. Referring to FIGS. 1A, 1B, and 2, an optical imaging system 100 of the present embodiment includes an imaging lens 110, and a spatial light modulator 200. The imaging lens 110 has an aperture stop position P. The spatial light modulator 200 is disposed at the aperture stop position P of the imaging lens 110 to serve as a pupil of the imaging lens 110. The spatial light modulator 200 is adapted to modulate a light transmission rate, e.g. an amplitude transmittance, of the spatial light modulator 200, so as to change an amplitude and a phase of a light intensity of the pupil.

More specifically, in the present embodiment, the imaging lens 110 includes at least one first lens 112 (e.g., one first lens 112 depicted in FIG. 1A), and at least one second lens 114 (e.g., one second lens 114 depicted in FIG. 1A). The spatial light modulator 200 is disposed on a transmission path of a light beam B between the first lens 112 and the second lens 114.

In the present embodiment, the light beam B from an object 50 is adapted to being collected by the imaging lens 110 and passed through the first lens 112, the spatial light modulator 200, and the second lens 114 in sequence, and thereafter imaged on an image plane I. In the embodiment, a light sensor 60 is disposed on the image plane I to detect the image of the object 50. The light sensor 60 is, for example, a complementary metal oxide semiconductor (CMOS) sensor, a charge coupled device (CCD), or a film. The film is, for example, a negative film or a positive film.

In the present embodiment of the invention, the spatial light modulator 200 further includes a plurality of micro pupil units 210. In more specifics, the spatial light modulator 200 is, for example, a digital micromirror device, and the micro pupil units 210 are micromirrors arranged in an array on the digital micromirror device, for instance. Each of the micro pupil units 210 (e.g., each of the micromirrors) is adapted to rotate a $+\theta$ angle, or rotate a $-\theta$ angle, in which $\theta$ is 12 degrees, for example. When the micromirrors rotate to the $+\theta$ angle (e.g., rotated to the position of the micro pupil units 210 illustrated by the solid lines in FIG. 1B), the spatial light modulator 200 is at an on-state. At this time, the micromirrors are adapted to reflect the light beam B (e.g., light beam B illustrated by the solid lines in FIG. 1B) such that the light beam B is transmitted to the second lens 114, and the second lens 114 images the light beam B onto the light sensor 60. On the other hand, when the micromirrors rotate to the $-\theta$ angle (e.g., rotated to the position of the micro pupil units 210 illustrated by the dotted lines in FIG. 1B), the spatial light modulator 200 is at an off-state. At this time, the micromirrors are adapted to reflect the light beam B (e.g., light beam B illustrated by the dotted lines in FIG. 1B) such that the light beam B deviates in a direction away from the second lens 114, where the light beam B cannot be transmitted to the second lens 114, and therefore the light beam B cannot be transmitted to the light sensor 60.

The micromirrors are adapted to rapidly oscillate between the $+\theta$ angle and the $-\theta$ angle. For example the micromirrors can provide 256 gray levels within a 5.6 milliseconds unit of time. The differences in gray levels are determined by differences in the ratios of the frequency the micromirrors are rotated to the $+\theta$ angle and the $-\theta$ angle per unit time. When the ratio of the frequency the micromirrors are rotated to the $+\theta$ angle per unit time is high, then a gray scale value is large. At this time, this represents the light transmission rate (e.g. transmittance amplitude) of the light beam B transmitted to the light sensor 60 is high, i.e., a large proportion of the light beam B is reflected by the micromirrors to the light sensor 60.

Moreover, the spatial light modulator 200 is adapted to modulate the micro pupil units 210 into a plurality of pupil regions 220 (e.g., as indicated in FIG. 2), in which each of the pupil regions 220 includes at least one micro pupil unit 210. For example, the pupil regions 220 may include 1, 4, or 9 micro pupil units 210 arranged in an array, or even more micro pupil units 210 arranged in an array. In the present embodiment, a light transmission rate of the pupil regions 220 symmetrically changes from a center to an edge of the pupil. For example, the light transmission rate of the pupil regions 220 progressively decreases from the center to the edge of the pupil. Moreover, in the embodiment, when each of the pupil regions 220 includes a plurality of micro pupil units 210, the light transmission rates of the micro pupil units 210 in a same pupil region 220 are substantially the same. As shown in FIG. 2, in each of the squares representing the pupil regions 220, a low density of intersecting lines represents a high light transmission rate. Conversely, a high density of intersecting lines represents a low light transmission rate.

In the present embodiment, the optical imaging system 100 further includes a beam direction converter 120 disposed on a transmission path of the light beam B between the first lens 112 and the spatial light modulator 200, and disposed on a transmission path of the light beam B between the spatial light modulator 200 and the second lens 114. In the embodiment, the beam direction converter 120 is, for example, a total internal reflection (TIR) prism. The TIR prism includes a first prism 122 and a second prism 124. A gap 126, for example an air gap, is disposed between the first prism 122 and the second prism 124. Due to the gap 126, a surface 128 of the second prism 124 facing the gap 126 becomes a TIR surface. When the light beam B is reflected by the micromirrors at the on-state, the surface 128 is adapted to totally reflect the light beam B (e.g., light beam B illustrated by the dotted lines in FIG. 1A) to the second lens 114. On the other hand, when the light beam B is reflected by the micromirrors at the off-state, the light beam B (e.g., light beam B illustrated by the dashed lines in FIG. 1A) is adapted to pass through the surface 128 and therefore cannot be transmitted to the second lens 114. The beam direction converter 120 can make an optical axis of the spatial light modulator 200 substantially parallel with an optical axis of the light beam B incident upon the spatial light modulator 200. Accordingly, the light beam B incident upon the spatial light modulator 200 partially overlaps the light beam B exiting the spatial light modulator 200, thereby reducing a volume of the optical imaging system 100 in the embodiment.

In the present embodiment, a distribution T'(x,y) of the light transmission rate of the pupil regions 220 of the spatial light modulator 200 may fit a curve T(x,y), as shown by the dotted lines illustrated in an upper diagram of FIG. 2. In FIG. 2, in order to present a clear illustration, the light transmission rate distribution T'(x,y) and the curve T(x,y) have been normalized on a position coordinate (e.g., horizontal axis) and a light transmission rate coordinate (e.g., vertical axis). In other words, the pupil according to an embodiment of the invention may be circularly symmetrical, but may be elliptically symmetrical in another embodiment.

In the present embodiment, the curve T(x,y) may be represented by the following function:

$$T(x, y) = \begin{cases} g(x, y), & \text{when } x^2 + y^2 \leq 1 \\ 0, & \text{when } x^2 + y^2 > 1 \end{cases}$$

In the present embodiment, g(x) is a function progressively decreasing from an origin (e.g., x=0 and y=0) to where $x^2+y^2=1$. In an embodiment of the invention, g(x,y)=g(-x, -y). In an embodiment illustrated by FIG. 2, $g(x)=1-(x^2+y^2)$, although the invention is not limited thereto. Moreover, the x and y directions of the above formula and in FIG. 2 are substantially perpendicular to the optical axis of the spatial light modulator 200, and the x-direction is substantially perpendicular to the y-direction.

Since the light transmission rate distribution T'(x,y) may be fitted to the curve T(x,y), the light transmission rate distribution function of the spatial light modulator 200 may be represented by the following formula:

$$T'(x, y) = E'(x, y) \otimes \sum_m \sum_n T(x, y) \delta\left(x - \frac{2mc}{D}\right) \delta\left(y - \frac{2nc}{D}\right)$$

where $0 \leq |m|, |n| \leq \text{Int}\left[\frac{D/c - 1}{2}\right]$ c in the above formula is, for example, a width c of the pupil regions 220 (as shown in FIG. 2), which is substantially an integer multiple of a width d of a micromirror. In FIG. 2 for instance, c is 5 times d. Moreover, D is a width D of the pupil formed by the spatial light modulator 200 (as shown in FIG. 2). $\delta[x-(2mc/D)]\delta[y-(2nc/D)]$ represents a delta function at a center position of the pupil region. In addition, E'(x,y)=[H(x+c/D)-H(x-c/D)]×[H(y+c/D)-H(y-c/D)] in which H(x+c/D), H(x-c/D), H(y+c/D), and H(y-c/D) are step functions, Int [(D/c-1)/2] represent an integer portion of the [(D/c-1)/2], and the ⊗ symbol represents a convolution operation.

An optical transfer function (OTF) of the optical imaging system 100 in the present embodiment may be mathematically calculated as follows. A pupil function f(x,y) of the optical imaging system 100 in the present embodiment may be represented by the following formula:

$$f(x,y) = T'(x,y) \exp[ikW(x,y)]$$

in which f(x,y) is a complex function. When the pupil is circularly symmetrical, f(x,y) may be represented by the following formula:

$$f(x, y) = \begin{cases} T'(x, y) \exp\left[ik \sum_\alpha \sum_\beta \omega_{\alpha\beta}(x^2 + y^2)^{\frac{\alpha-\beta}{2}} y^\beta\right], & \text{when } x^2 + y^2 \leq 1 \\ 0, & \text{when } x^2 + y^2 > 1 \end{cases}$$

in which α and β are non-negative integers. Moreover, $\omega_{\alpha\beta}$ is an coefficient for generating different types of optical image aberrations. For example, $\omega_{20}$ is a defocus aberration coefficient, $\omega_{40}$ is a spherical aberration coefficient, and $\omega_{31}$ is a coma aberration coefficient. In addition, $k=2\pi/\lambda$.

Figure 3A:
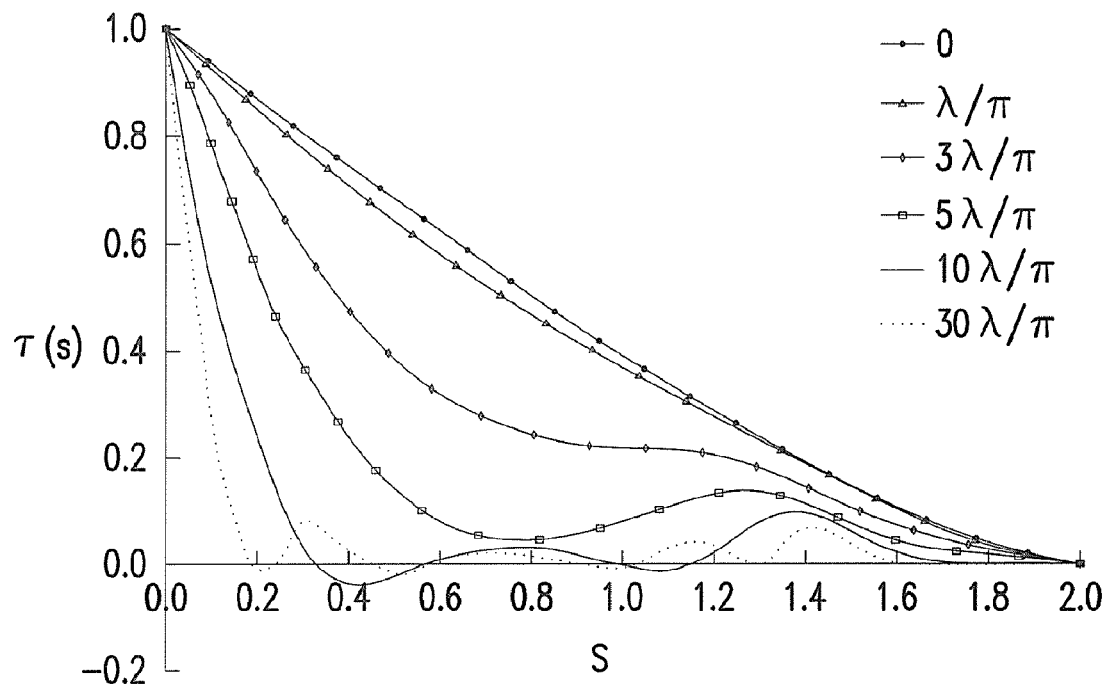
FIG. 3A is a curve diagram of an optical transfer function (OTF) calculated for an comparison system of the optical imaging system depicted in FIG. 1A.

Moreover, an OTF τ(s) of the optical imaging system 100 in the present embodiment may be calculated by the following formula:

$$\tau(s) = \frac{\int_{-\infty}^{\infty} \int_{-\infty}^{\infty} f(x + s/2, y) f^*(x - s/2, y) dx dy}{\int_{-\infty}^{\infty} \int_{-\infty}^{\infty} f(x, y) f^*(x, y) dx dy}$$

in which s is a spatial frequency and $s=F\lambda N$. F is an f-number of the imaging lens 110, λ is a wave length, and N is a number of cycles per unit length in the image plane. Moreover, f*(x,y) is a complex conjugate of f(x,y). K is defined as K≡(c/D). As shown in FIG. 2, the smaller the value of c, the narrower the width c of the pupil regions 220. Accordingly, the spatial light modulator 200 can generate a larger quantity of pupil regions 220. A large quantity of pupil regions 220 can generate a light transmission rate distribution function T'(x,y) having a large number of gray levels (e.g., the number of gray levels depicted in the upper diagram of FIG. 2) to fit the curve T(x,y). FIG. 3A is a curve diagram of an OTF calculated for a comparison system of the optical imaging system depicted in FIG. 1A. The comparison system used for FIG. 3A employs a clear aperture, which is a fully light transmissive aperture.

In the present embodiment, the optical imaging system 100 further includes a control unit 150 electrically connected to the spatial light modulator 200, for controlling the modulation of the spatial light modulator 200. For example, according to a user requirement, the control unit 150 may control a magnitude of the value of K, and may determine what type of functions to be fit by the light transmission rate distribution function T'(x,y).

Figure 3B:
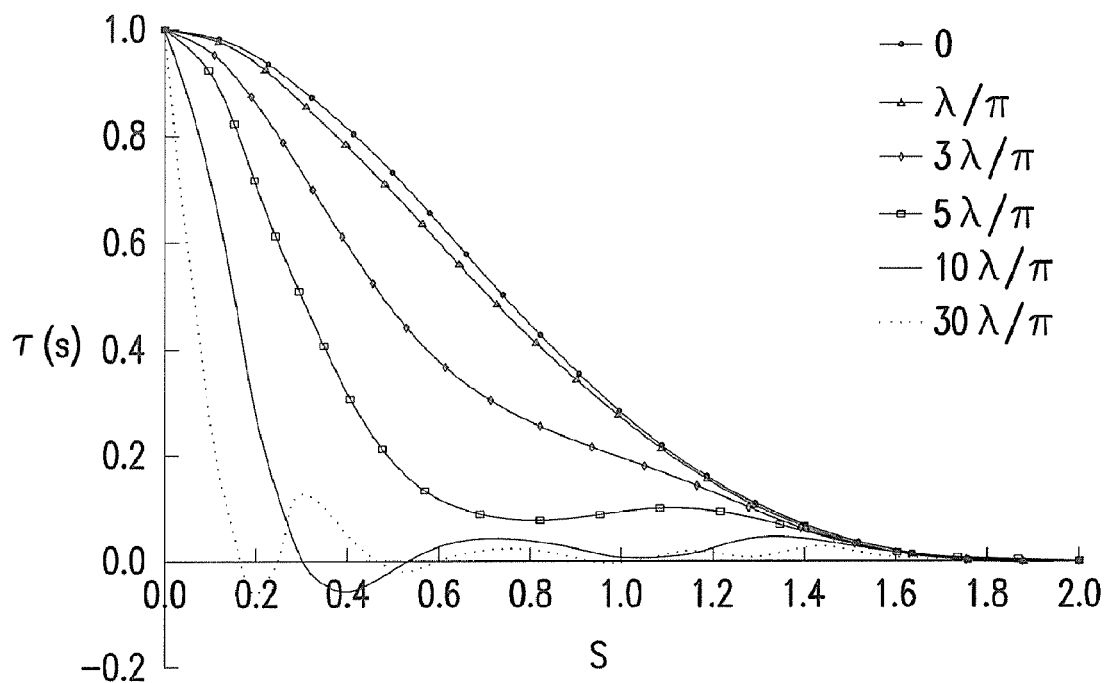
FIGS. 3B, 3C, and 3D are respective curve diagrams of OTFs calculated when K=0, K=0.05, and K=0.3 for the optical imaging system depicted in FIG. 1A.
Figure 3C:
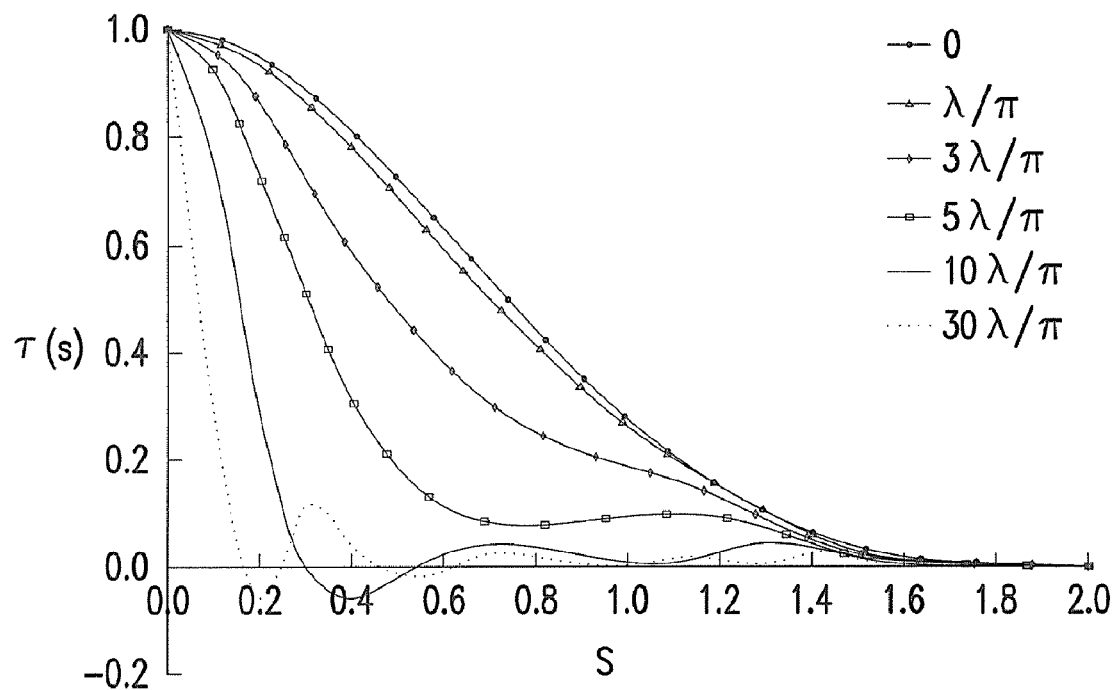
Figure 3D:
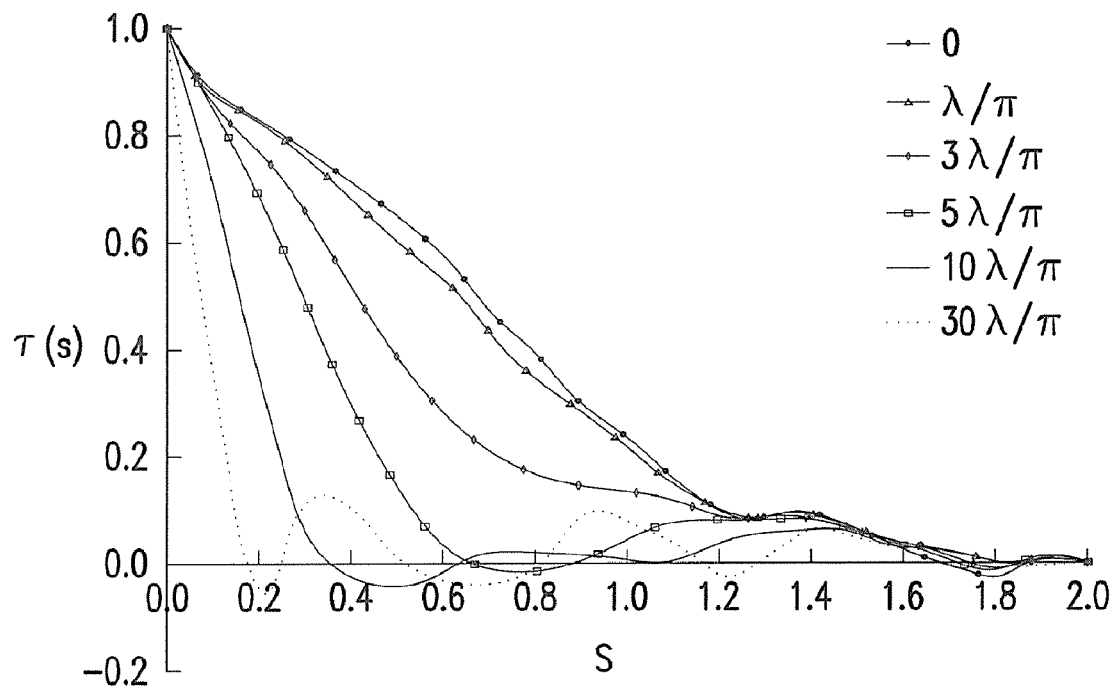

FIGS. 3B-3D respectively illustrates the curve diagrams of the OTFs calculated for K=0, K=0.05, and K=0.3 of the optical imaging system depicted in FIG. 1A. Herein, K=0 represents the value of c trends toward 0, and further represents the light transmission rate distribution T'(x,y) is approximate to the curve T(x,y). Moreover, the vertical axes of FIGS. 3A-3D represent the moduli of the OTFs, in other words the modulation transfer functions. The horizontal axes represent the spatial frequency, or s in the above formula. Moreover, the curves depicted in FIGS. 3A-3D are derived from inputting $-\omega_{20}=\omega_{40}=\omega_{31}=0$, $\lambda/\pi$, $3\lambda/\pi$, $5\lambda/\pi$, $10\lambda/\pi$, $20\lambda/\pi$ into the above formula for τ(s). As shown in FIGS. 3A-3D, with different values of K, the image resolutions are different for various spatial frequencies and degrees of image aberrations. For example, when the spatial frequency is approximately 0.5, a comparison of the moduli of the OTFs on the $5\lambda/\pi$ curves shown in FIGS. 3A-3D finds the largest modulus from FIG. 3C, which is larger than the modulus from FIG. 3A. Therefore, regarding the resolution of images having a spatial frequency of 0.5, the optical imaging system 100 of the present embodiment is preferable over the comparison system.

In order to make the foregoing description more comprehensible to readers, the table below lists the moduli of the OTFs for spatial frequency s=0.085 under different conditions of the optical imaging system 100 in the present embodiment and the comparison system.

TABLE 1

| Pupil Shape | Clear Aperture | K = 0.05 | K = 0.3 |
|---|---|---|---|
| Aberration Coefficients 0 | | | |
| Defocus ($\omega_{20}$) | 0.95 | 0.98 | 0.86 |
| Spherical Aberration ($\omega_{40}$) | 0.95 | 0.98 | 0.90 |

TABLE 1-continued

| Pupil Shape | Clear Aperture | K = 0.05 | K = 0.3 |
|---|---|---|---|
| Coma Aberration ($\omega_{31}$) | 0.95 | 0.98 | 0.86 |
| Three Combined | 0.95 | 0.98 | 0.90 |
| Aberration Coefficients $5\lambda/\pi$ | | | |
| Defocus ($\omega_{20}$) | 0.64 | 0.81 | 0.71 |
| Spherical Aberration ($\omega_{40}$) | 0.55 | 0.87 | 0.77 |
| Coma Aberration ($\omega_{31}$) | 0.90 | 0.97 | 0.84 |
| Three Combined | 0.83 | 0.94 | 0.87 |
| Aberration Coefficients $10\lambda/\pi$ | | | |
| Defocus ($\omega_{20}$) | 0.13 | 0.41 | 0.38 |
| Spherical Aberration ($\omega_{40}$) | 0.28 | 0.68 | 0.54 |
| Coma Aberration ($\omega_{31}$) | 0.75 | 0.92 | 0.80 |
| Three Combined | 0.60 | 0.78 | 0.75 |
| Aberration Coefficients $20\lambda/\pi$ | | | |
| Defocus ($\omega_{20}$) | 0.00 | 0.07 | 0.22 |
| Spherical Aberration ($\omega_{40}$) | 0.17 | 0.47 | 0.41 |
| Coma Aberration ($\omega_{31}$) | 0.36 | 0.74 | 0.65 |
| Three Combined | 0.33 | 0.37 | 0.37 |

In the above Table 1, a value 0.68 in the space corresponding to the aberration coefficient of $10\lambda/\pi$, K=0.05, and spherical aberration represents that under this condition, the modulus of the OTF is 0.68. The meaning of the values corresponding to the other spaces can be derived from the foregoing description. From Table 1 above, with K=0.05 and K=0.3 for the optical imaging system 100 in the present embodiment, the moduli of the OTFs are larger than the moduli of the OTFs for the clear aperture. This is particularly pronounced when the aberration coefficients are larger or equal to $5\lambda/\pi$. Moreover, the "Three Combined" refers to a combined effect when all three of the defocus ($\omega_{20}=-\omega_{40}$), spherical aberration ($\omega_{40}$), and coma aberration ($\omega_{31}$) are employed.

As shown from the above values gathered from mathematical calculations, the optical imaging system 100 in the embodiment may achieve a preferable imaging quality. Moreover, even under defocused conditions, the optical imaging system 100 in the embodiment can still maintain a high modulus of the OTF. In other words, the optical imaging system 100 has a large depth of field. In the present embodiment, the optical imaging system 100 may serve as an imaging system of a video camera or other optical systems. Since the optical imaging system 100 can achieve a large depth of field, therefore combined with the control from an imaging software, an optimized depth of field effect may be achieved. Moreover, applications in currently available medical equipments may be feasible without drastic alterations to the optical system framework. In other words, even when an imaging lens of a mediocre resolution and a cheap price is adopted, due to the modulation of the spatial light modulator 200, a preferably high image resolution can be achieved, thereby saving the cost for lenses. Further, due to the large depth of field, the optical imaging system 100 of the embodiment may be applied in diagnostic medical equipments such as fundus cameras or endoscopes examining the mouth and throat.

In addition, when the optical imaging system 100 of the embodiment is applied in video cameras, different K values may be employed to image a same object, thereby achieving an image having a high dynamic range.

It should be noted that the spatial light modulator 200 is not limited to the digital micromirror device in the invention. In other embodiments of the invention, the spatial light modulator 200 may also be a reflective liquid crystal panel, for example a liquid-crystal-on-silicon (LCOS) panel, in which the micro pupil units are the pixels of the LCOS panel, and the light transmission rate is a light reflectivity generated by the pixels for light of a specific polarization direction.

Moreover, in other embodiments, a beam splitter may be adopted for the beam direction converter 120. The beam splitter may be a partially-transmissive-partially-reflective device, or a polarizing beam splitter (PBS). The PBS is adapted for use when the spatial light modulator 200 is a reflective liquid crystal panel.

Furthermore, in other embodiments, the optical imaging system 100 may also omit the beam direction converter 120, in which the micromirrors at the on-state directly reflect the light beam B to the second lens 114, and the micromirrors at the off-state cannot transmit the light beam B to the second lens 114.

It is worth noting that, a quantity of the first lens 112 may be plural for forming a lens group. Moreover, a quantity of the second lens 114 may also be plural for forming a lens group.

Figure 4:
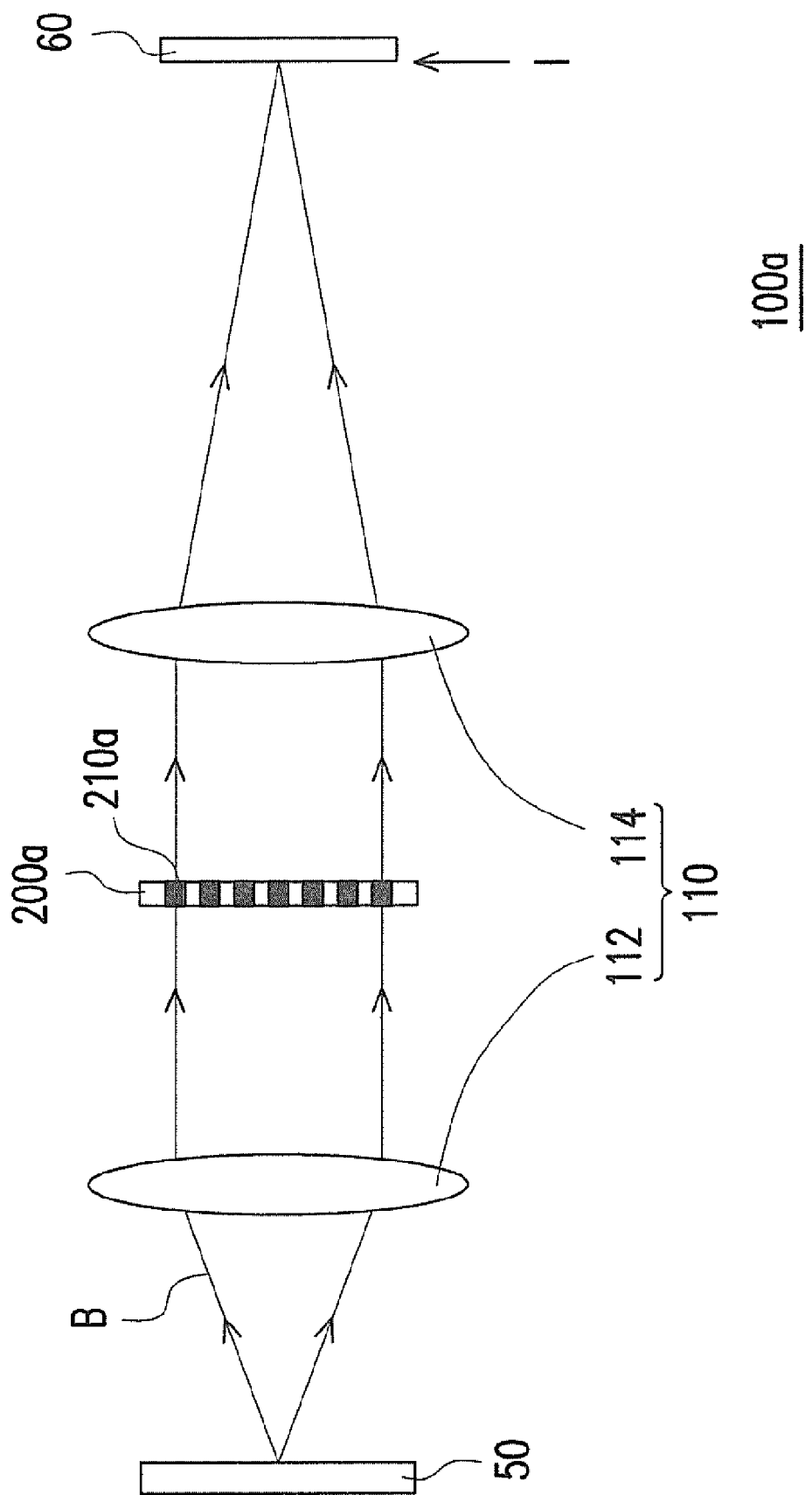
FIG. 4 is a schematic view of an optical path of an optical imaging system according to another embodiment of the invention.

FIG. 4 is a schematic view of an optical path of an optical imaging system according to another embodiment of the invention. Referring now to FIG. 4, an optical imaging system 100a of the present embodiment is similar to the aforementioned optical imaging system 100 depicted in FIG. 1A. The dissimilarities are described below. In the present embodiment, a spatial light modulator 200a of the optical imaging system 100a is a transmissive liquid crystal panel, a plurality of micro pupil units 210a are pixels arranged in an array of the transmissive liquid crystal panel, and a light transmission rate is the light transmittance of the pixels. The optical imaging system 100a of the present embodiment is capable of achieving the advantages and effects of the optical imaging system 100 depicted in FIG. 1A, hence further description thereof is omitted hereinafter. Moreover, since the spatial light modulator 200a is a transmissive and not a reflective spatial light modulator, therefore in the present embodiment, the beam direction converter 120 depicted in FIG. 1A may be not required to change a transmission direction of the light beam B from the spatial light modulator 200a.

Figure 5:
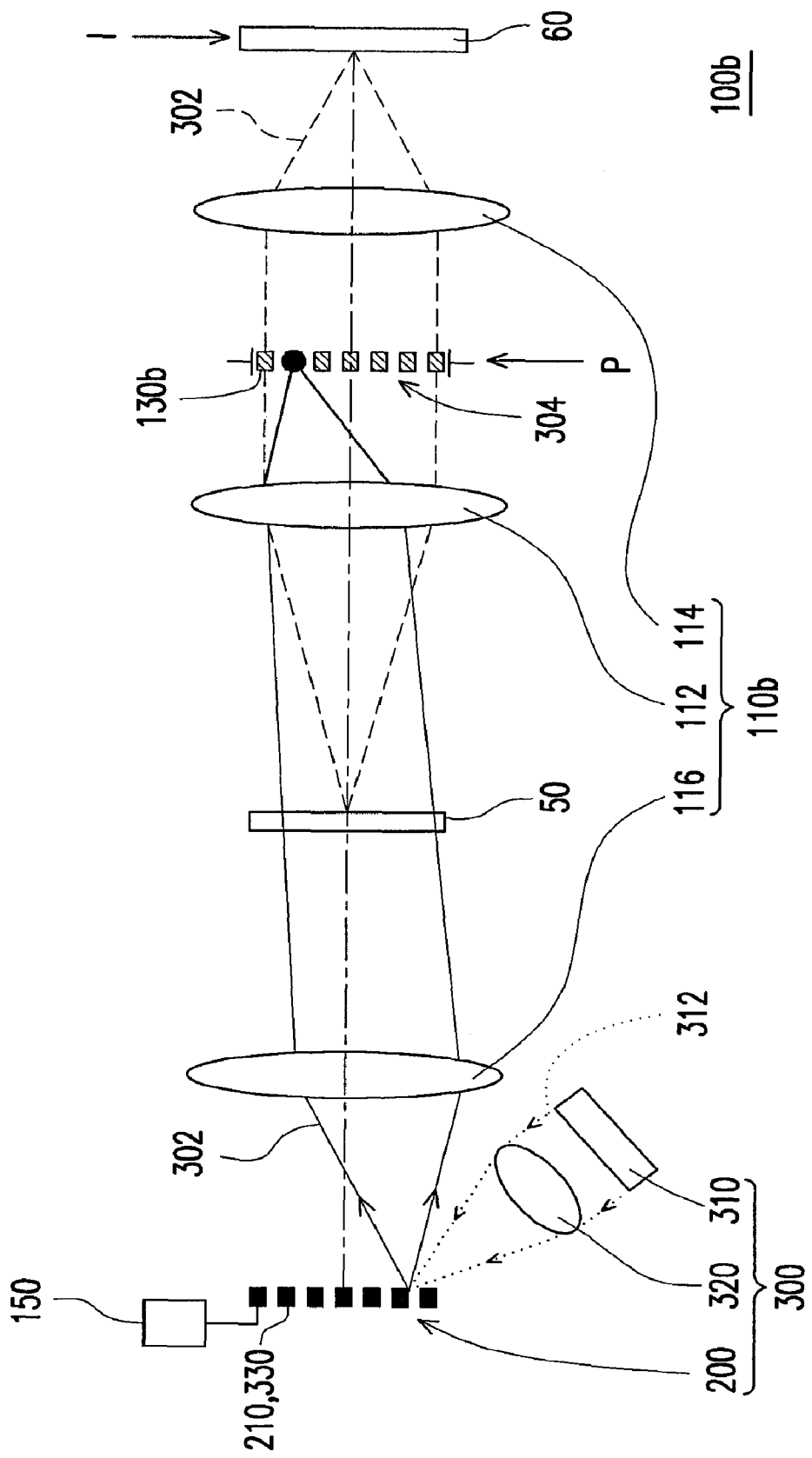
FIG. 5 is a schematic view of an optical path of an optical imaging system according to yet another embodiment of the invention.

FIG. 5 is a schematic view of an optical path of an optical imaging system according to yet another embodiment of the invention. Referring now to FIG. 5, an optical imaging system 100b of the present embodiment is similar to the aforementioned optical imaging system 100 depicted in FIG. 1A. The dissimilarities are described below. In the optical imaging system 100b of the present embodiment, no spatial light modulator is disposed at the aperture stop position P of an imaging lens 110b. Instead, in the embodiment, the optical imaging system 100b includes a spatial light modulating light source 300. The spatial light modulating light source 300 is adapted to provide a structural beam 302 to illuminate the object 50, in which the structural beam 302 is imaged at the aperture stop position P. In the present embodiment, an image 304 of the imaging of the structural beam 302 at the aperture stop position P is used to replace the light transmission rate distribution generated by the spatial light modulator 200 depicted in FIG. 1A.

More specifically, the spatial light modulating light source 300 is adapted to modulate the structural beam 302 in order to alter the image 304 of the structural beam 302 imaged at the aperture stop position P. In addition, the aperture stop position P is disposed on a transmission path of the structural beam 302 between the spatial light modulating light source 300 and the image plane I. In the present embodiment, the spatial light modulating light source 300 includes a light source 310 and the spatial light modulator 200. The light source 310 is adapted to provide an illumination beam 312. The spatial light modulator 200 is disposed on a transmission path of the illumination beam 312 to convert the illumination beam 312 into the structural beam 302. In the embodiment, the spatial light modulating light source 300 includes at least one lens 320 (e.g., one lens 320 in the embodiment for example), disposed on a transmission path of the illumination beam 312 between the spatial light modulator 200 and the light source 310. Further, in the embodiment, the optical imaging system 100b further includes at least one third lens 116 disposed on a transmission path of the structural beam 302 between the spatial light modulating light source 300 and the object 50. In the present embodiment, the structural beam 302 is adapted to pass through the object 50 and be transmitted to the first lens 112, thereby passing through the aperture stop position P and the second lens 114 to be transmitted to the image plane I. In other words, the aperture stop position P is disposed on a transmission path of the structural beam 302 between the first lens 112 and the second lens 114. Moreover, the object 50 is imaged on the image plane I, or imaged onto the light sensor 60.

In the present embodiment of the invention, the spatial light modulator 200 is the same as the spatial light modulator 200 depicted in FIG. 1A, in that both are digital micromirror devices. Moreover, in the embodiment, the spatial light modulating light source 300 has a plurality of micro light source units 330. Specifically, when the micromirrors of the spatial light modulator 200 (e.g., the micro pupil units 210 depicted in FIG. 1A) are at the on-state, the illumination beam 312 can be reflected to the third lens 116. In other words, the micromirrors (e.g., the micro pupil units 210) form a micro light source unit 330. A plurality of micromirrors at the on-state, therefore, can form a plurality of micro light source units 330. Hence, the illumination beam 312 is converted into the structural beam 302. Moreover, the spatial light modulating light source 300 is adapted to modulate the micro light source units 330 into a plurality of light source regions. A light intensity of the light source regions progressively decreases from a center to an edge of the spatial light modulating light source 300.

In the embodiment, each of the light source regions includes at least one micro light source unit 330. When each of the light source regions includes a plurality of micro light source units 330, the light intensities of the micro light source units 330 in a same light source region are substantially the same. In other words, the micro pupil units 210 depicted in FIG. 1A may be viewed as the micro light source units 330 of the present embodiment, the pupil regions 220 of FIG. 2 may be viewed as the light source regions of the present embodiment, and the light transmission rate of the pupil regions 220 of FIG. 2 may be viewed as the light intensity of the light source regions of the present embodiment. Furthermore, the image 304 of the structural beam 302 at the aperture stop position P may be viewed, for instance, as a projected image of the pupil formed by the spatial light modulator 200 depicted in FIG. 1A. Whether an actual pupil is disposed at the aperture stop position P as in FIG. 1A, or the image (e.g., image 304) of the pupil is set at the aperture stop position P, similar light modulation effects are achieved for imaging the object 50 onto the light sensor 60. In other words, placing the image of the pupil at the aperture stop position P is the same or similar to configuring an actual pupil at the aperture stop position P. Therefore, the light intensity distribution of the light source regions in the present embodiment may be fully referenced to the light transmission rate distribution described by the embodiment depicted in FIG. 1B, and hence further description thereof is omitted hereinafter.

In the present embodiment, the control unit 150 is electrically connected to the spatial light modulating light source 300, for controlling the modulation of the spatial light modulating light source 300. Specifically, the control unit 150 is electrically connected to the spatial light modulator 200, for example, for controlling the modulation of the spatial light modulator 200. The control unit 150 may determine what types of functions to be fit by the light intensity distribution function of the light source regions, and the control unit 150 may determine the value of K. Further, the optical imaging system 100b of the present embodiment is capable of achieving the same or similar advantages and effects of the optical imaging system 100 depicted in FIG. 1A, hence further description thereof is omitted hereinafter.

Moreover, in the embodiment, an aperture stop 130b may be disposed on the aperture stop position P, and the aperture stop 130b has an opening, in which the image 304 is formed in the opening.

The optical imaging system 100b in the embodiment may be applied in a microscope to inspect the object 50. However, in other embodiments of the invention, when the object 50 is a spatial light modulator (e.g., a transmissive liquid crystal panel), and the light sensor 60 is swapped with a screen, then the optical imaging system 100b can serve as a projection system for projecting an image of the spatial light modulator (e.g., the object 50) onto the screen. Moreover, in other embodiments, the object 50 may also be a slide. According to the foregoing analysis of the mathematical calculations, with different values of K, the resolutions are different for various spatial frequencies. Therefore, when the optical imaging system 100b is applied in a projection apparatus displaying an image from a blu-ray disc or a DVD, the spatial frequency of the image is high. Thus, in order to produce a sharp image, a K value having a preferable resolution for the high spatial frequency may be used to display the image. On the other hand, when displaying a lower resolution image from a cable or non-cable television signals, then a K value having a preferable resolution for the lower spatial frequency may be used to display the image, so the image appears natural.

It should be noted that, the invention is not limited with the digital micromirror device being employed for the spatial light modulator 200 in the spatial light modulating light source 300. In other embodiments, a reflective liquid crystal panel may be adopted.

Figure 6:
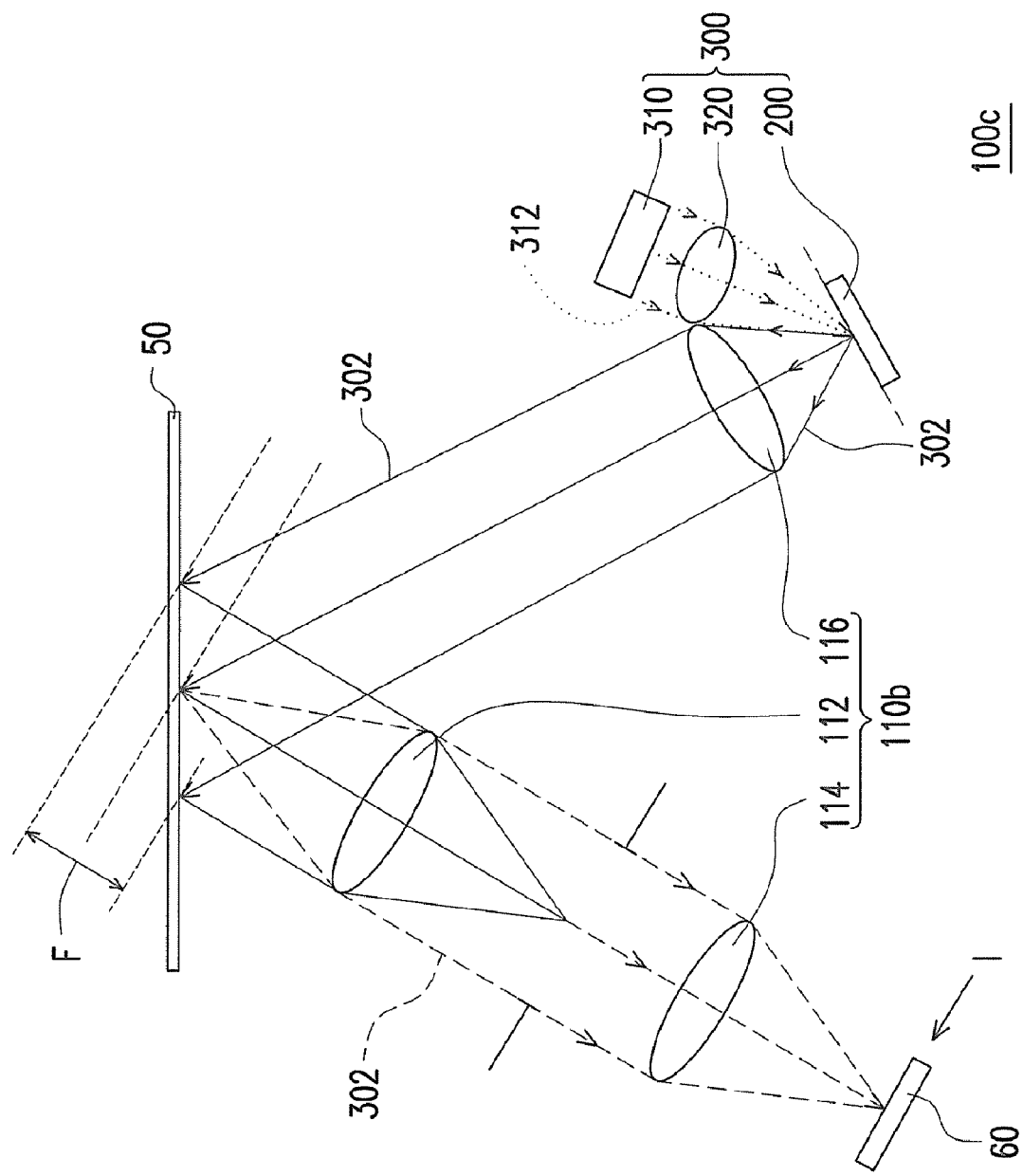
FIG. 6 is a schematic view of an optical path of an optical imaging system according to yet another embodiment of the invention.

FIG. 6 is a schematic view of an optical path of an optical imaging system according to yet another embodiment of the invention. Referring to FIG. 6, an optical imaging system 100c in the embodiment is similar to the optical imaging system 100b depicted in FIG. 5. A difference therebetween is that the optical imaging system 100b in FIG. 5 images onto the light sensor 60 the image of the object 50 carried by the structural beam 302 passing through the object 50, whereas the optical imaging system 100c images onto the light sensor 60 the image of the object 50 carried by the structural beam 302 and reflected by the object 50. The optical imaging system 100c of the present embodiment is capable of achieving similar advantages and effects of the optical imaging system 100 depicted in FIG. 1A. For example, since the optical imaging system 100c in the embodiment has a large depth of field F, therefore even when the object 50 is inclined with respect to the structural beam 302, the object 50 can still be clearly imaged onto the light sensor 60.

The object 50 of the embodiment may also be a spatial light modulator, for example a digital micromirror device or a reflective liquid crystal panel, and the light sensor 60 may be swapped with a screen such that the optical imaging system 100c may serve as a projection system.

Figure 7:
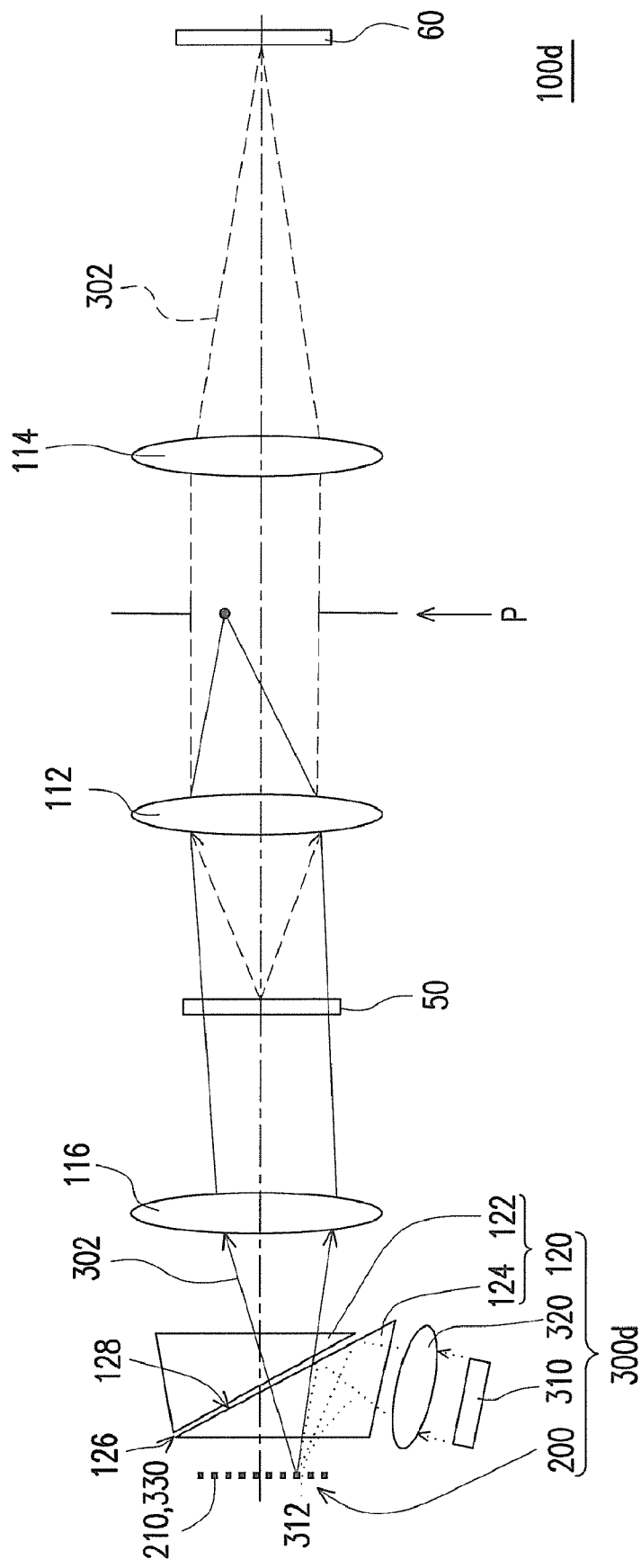
FIG. 7 is a schematic view of an optical path of an optical imaging system according to yet another embodiment of the invention.

FIG. 7 is a schematic view of an optical path of an optical imaging system according to yet another embodiment of the invention. Referring now to FIG. 7, an optical imaging system 100d of the present embodiment is similar to the aforementioned optical imaging system 100b depicted in FIG. 5. The dissimilarities are described below. In the present embodiment, a spatial light modulating light source 300d further includes the beam direction converter 120 depicted in FIG. 1A, for example. The beam direction converter 120 is disposed on a transmission path of the illumination beam 312 between the light source 310 and the spatial light modulator 200, and disposed on a transmission path of the structural beam 302 between the spatial light modulator 200 and the aperture stop position P. In the embodiment, the illumination beam 312 from the light source 310 is adapted to be totally reflected by the TIR surface 128 to the spatial light modulator 200, and the micromirrors in the spatial light modulator 200 at the on-state are adapted to convert the illumination beam 312 into the structural beam 302 passing through the TIR surface 128. In other embodiments, a beam splitter or a PBS may be adopted for the beam direction converter 120 in accordance to a user requirement.

Figure 8:
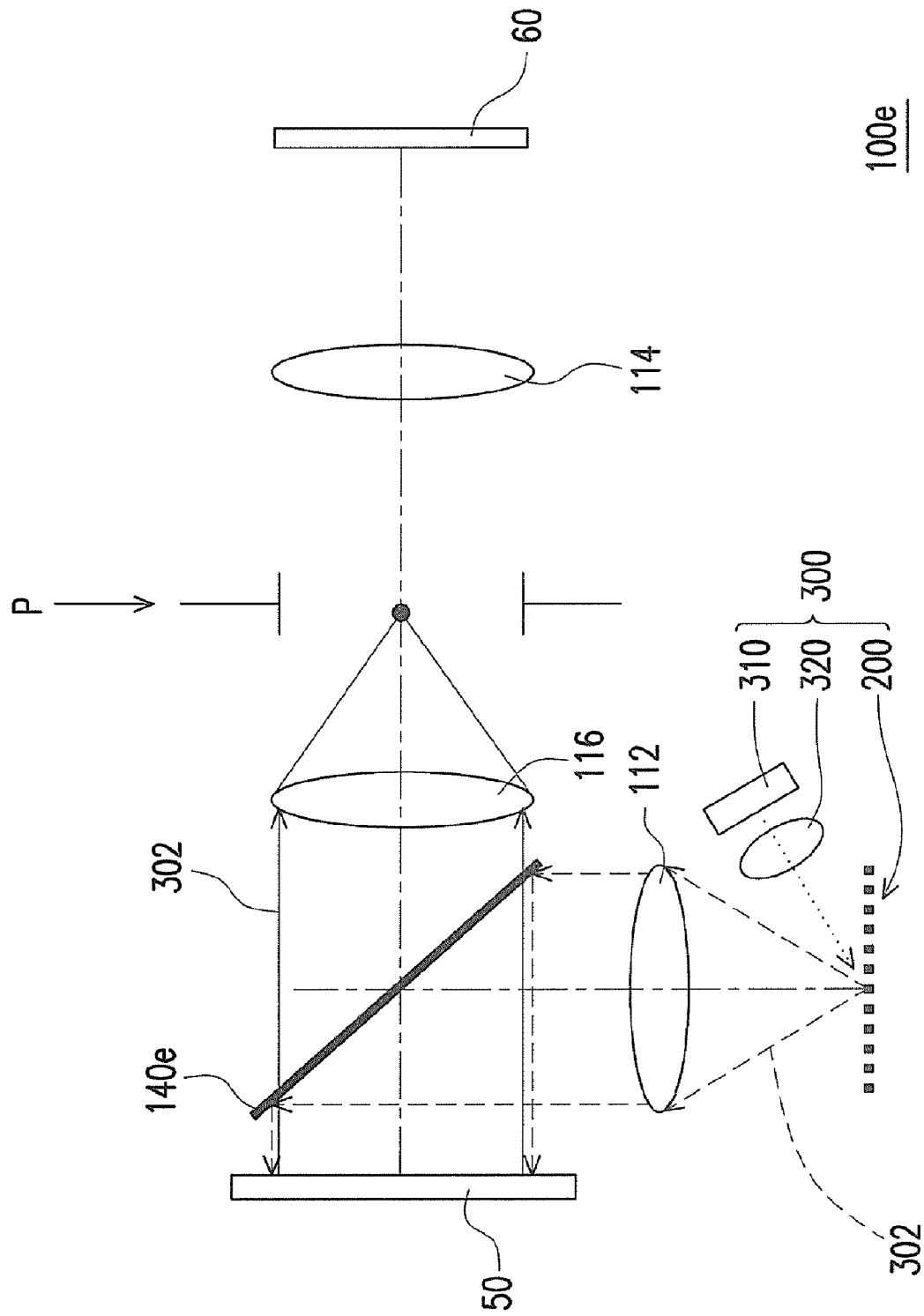
FIG. 8 is a schematic view of an optical path of an optical imaging system according to yet another embodiment of the invention.

FIG. 8 is a schematic view of an optical path of an optical imaging system according to yet another embodiment of the invention. Referring now to FIG. 8, an optical imaging system 100e of the present embodiment is similar to the aforementioned optical imaging system 100c depicted in FIG. 6. The dissimilarities are described below. In the present embodiment, the optical imaging system 100e further includes a beam direction converter 140e disposed on a transmission path of the structural beam 302 between the spatial light modulating light source 300 and the object 50, and disposed on a transmission path of the structural beam 302 between the object 50 and the first lens 112. In the embodiment, the beam direction converter 140e is a beam splitter, for example a partially-transmissive-partially-reflective reflecting mirror, adapted to reflect a portion of the structural beam 302 from the spatial light modulating light source 300 to the object 50, and adapted to transmit a portion of the structural beam 302 from the object 50 to the aperture stop position P. In other embodiments, the beam direction converter 140e may also be a TIR prism or a PBS unit. When the beam direction converter 140e is a PBS unit (e.g., a PBS mirror or a PBS prism), a polarizing light source may be employed for the light source 310. Accordingly, a quarter wave plate may be configured on a transmission path of the structural beam 302 between the PBS unit and the object 50.

Figure 9:
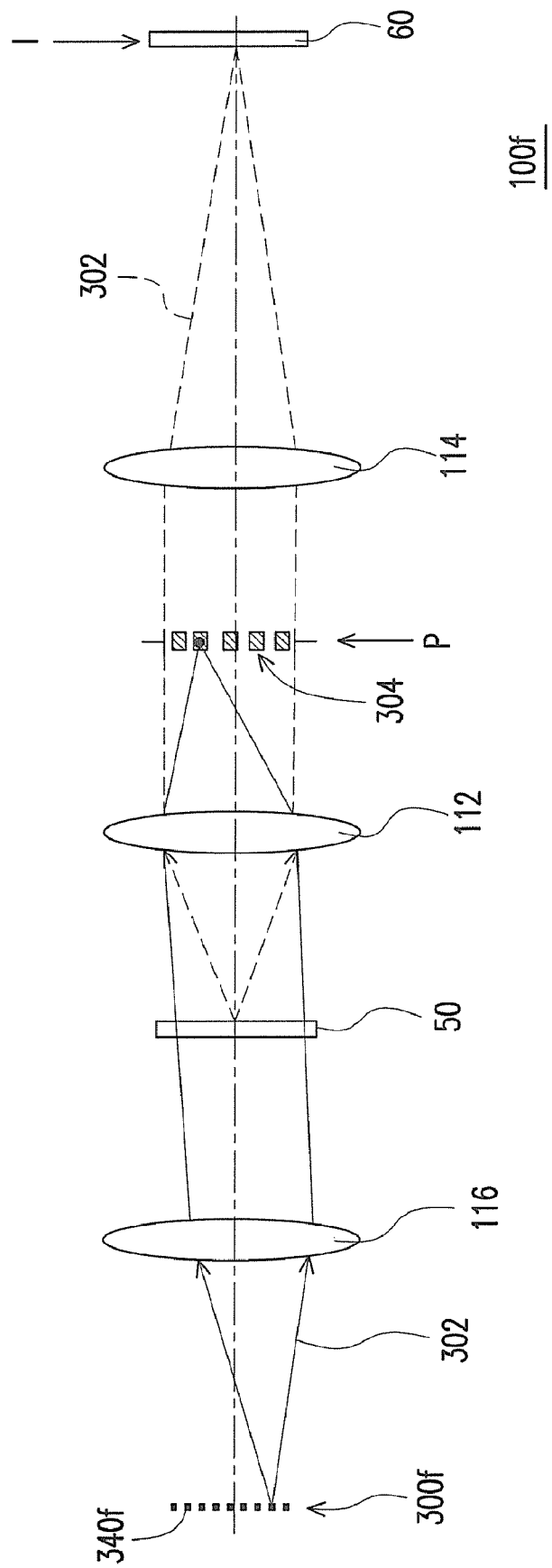
FIG. 9 is a schematic view of an optical path of an optical imaging system according to yet another embodiment of the invention.

FIG. 9 is a schematic view of an optical path of an optical imaging system according to yet another embodiment of the invention. Referring now to FIG. 9, an optical imaging system 100f of the present embodiment is similar to the aforementioned optical imaging system 100b depicted in FIG. 5. The dissimilarities are described below. In the optical imaging system 100f of the embodiment, a spatial light modulating light source 300f is, for example, a light emitting diode (LED) array, an organic light emitting diode (OLED) array, a plasma display panel (PDP), a field emission display (FED) panel, or a cathode ray tube (CRT). In other words, the spatial light modulating light source 300f is a self-emissive display, and the luminance of a pixel 340f in the spatial light modulating light source 300f may determine the light intensity of the light source regions.

Figure 10:
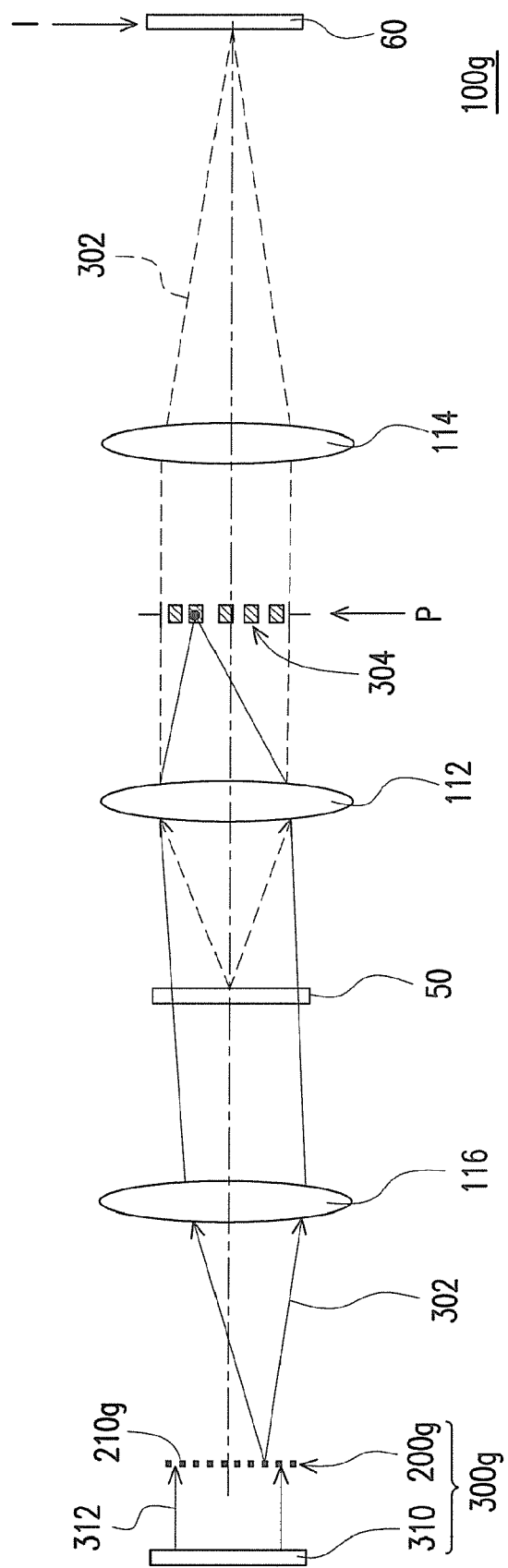
FIG. 10 is a schematic view of an optical path of an optical imaging system according to yet another embodiment of the invention.

FIG. 10 is a schematic view of an optical path of an optical imaging system according to yet another embodiment of the invention. Referring now to FIG. 10, an optical imaging system 100g of the present embodiment is similar to the aforementioned optical imaging system 100b depicted in FIG. 5. The dissimilarities are described below. In the optical imaging system 100g of the present embodiment, a spatial light modulator 200g is, for example, a transmissive liquid crystal panel, and a portion of the illumination beam 312 of the light source 310 is adapted to pass through the spatial light modulator 200g to form the structural beam 302.

In view of the foregoing, in an optical imaging system according to an embodiment of the invention, since a spatial light modulator is employed to serve as a pupil, or a spatial light modulating light source is employed to provide a structural beam imaged at an aperture stop position, an amplitude and a phase of a light intensity of the pupil or the structural beam can be changed. Accordingly, different imaging effects may be produced according to user requirements.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical imaging system, comprising:
   an imaging lens having an aperture stop position; and
   a spatial light modulator disposed at the aperture stop position of the imaging lens to serve as a pupil of the imaging lens, wherein the spatial light modulator is adapted to modulate a light transmission rate of the spatial light modulator, so as to change an amplitude and a phase of a light intensity of the pupil, the spatial light modulator has a plurality of micro pupil units, the spatial light modulator is adapted to modulate the micro pupil units into a plurality of pupil regions, and a light transmission rate of the pupil regions symmetrically changes from a center to an edge of the pupil.

2. The optical imaging system as claimed in claim 1, wherein each of the pupil regions comprises at least one micro pupil unit.

3. The optical imaging system as claimed in claim 2, wherein when each of the pupil regions comprises a plurality of micro pupil units, the light transmission rates of the micro pupil units in a same pupil region are substantially the same.

4. The optical imaging system as claimed in claim 1, wherein the spatial light modulator is a digital micromirror device, a reflective liquid crystal panel, or a transmissive liquid crystal panel.

5. The optical imaging system as claimed in claim 1, wherein the imaging lens comprises:
   at least one first lens; and
   at least one second lens, wherein the spatial light modulator is disposed on a transmission path of a light beam between the first lens and the second lens, and the optical imaging system further comprises a beam direction converter disposed on a transmission path of a light beam between the first lens and the spatial light modulator, and disposed on a transmission path of a light beam between the spatial light modulator and the second lens.

6. The optical imaging system as claimed in claim 5, wherein the beam direction converter comprises a total internal reflection (TIR) prism or a beam splitter.

7. The optical imaging system as claimed in claim 1, further comprising a control unit electrically connected to the spatial light modulator for controlling the modulation of the spatial light modulator.

8. An optical imaging system adapted to image an object onto an image plane, the optical imaging system comprising:
an imaging lens having an aperture stop position; and
a spatial light modulating light source adapted to provide a structural beam to illuminate the object, wherein the structural beam is imaged at the aperture stop position, the spatial light modulating light source is adapted to modulate the structural beam, so as to change an amplitude and a phase distribution of a light intensity of the structural beam imaged at the aperture stop position, and the aperture stop position is disposed on a transmission path of the structural beam between the spatial light modulating light source and the image plane, the spatial light modulating light source has a plurality of micro light source units, the spatial light modulating light source is adapted to modulate the micro light source units into a plurality of light source regions, and an intensity of the light source regions symmetrically changes from a center to an edge of the spatial light modulating light source.

9. The optical imaging system as claimed in claim 8, wherein each of the light source regions comprises at least one micro light source unit.

10. The optical imaging system as claimed in claim 9, wherein when each of the light source regions comprises a plurality of micro light source units, the light intensities of the micro light source units in a same light source region are substantially the same.

11. The optical imaging system as claimed in claim 8, wherein the spatial light modulating light source comprises:
a light source adapted to provide an illumination beam; and
a spatial light modulator disposed on a transmission path of the illumination beam to convert the illumination beam into the structural beam.

12. The optical imaging system as claimed in claim 11, wherein the spatial light modulator is a digital micromirror device, a reflective liquid crystal panel, or a transmissive liquid crystal panel.

13. The optical imaging system as claimed in claim 11, further comprising a beam direction converter disposed on a transmission path of the illumination beam between the light source and the spatial light modulator, and disposed on a transmission path of the structural beam between the spatial light modulator and the aperture stop position.

14. The optical imaging system as claimed in claim 13, wherein the beam direction converter comprises a TIR prism, a beam splitter, or a polarizing beam splitter.

15. The optical imaging system as claimed in claim 8, wherein the spatial light modulator is a light emitting diode array, an organic light emitting diode array, a plasma display panel, a field emission display panel, or a cathode ray tube.

16. The optical imaging system as claimed in claim 8, wherein the imaging lens comprises:
at least one first lens; and
at least one second lens, wherein the aperture stop position is disposed on a transmission path of the structural beam between the first lens and the second lens, and the optical imaging system further comprises at least one third lens disposed on a transmission path of the structural beam between the spatial light modulating light source and the object.

17. The optical imaging system as claimed in claim 8, further comprising a control unit electrically connected to the spatial light modulating light source for controlling the modulation of the spatial light modulating light source.

* * * * *